3,405,151
CHROMATOGRAPHIC SEPARATION OF GAMMA-LINOLENIC ACID ESTERS

John E. Pike, Kalamazoo, Mich., assignor to The Upjohn Company, Kalamazoo, Mich., a corporation of Michigan
No Drawing. Filed July 1, 1966, Ser. No. 562,122
10 Claims. (Cl. 260—410.9)

This invention relates to a method for the purification of fatty acid lower alkyl esters. It is especially concerned with the separation of pure γ-linolenic acid lower alkyl esters from associated isomers of substantially the same molecular weight by column chromatography on an adsorbent impregnated with silver nitrate.

This invention constitutes an improved process for the separation of lower alkyl esters of unsaturated fatty acids using a high load column chromatogram. This method is the only one available for effecting such separation in the large scale preparation of pure γ-linolenic acid lower alkyl esters. After alkaline hydrolysis, the corresponding free acid can be obtained.

An important feature of the present purification method is the high ratio of fatty acid esters applied to the column, a 1 to 3 to about 1 to 10 ratio being advantageously employed. In marked contrast, 1 part of compound is usually applied to between about 30 to about 100 parts of adsorbent in conventional column chromatography. The use of a low percentage of adsorbent in the present process facilitates the rate at which the column can be operated and lowers the time during which the relatively unstable polyunsaturated acids and/or their esters are exposed to the atmosphere; the column can run rapidly. The use of relatively less adsorbent is also advantageous in lowering the cost of the method.

Readily available adsorbents such as diatomaceous earth (e.g. Celite), synthetic magnesium silicate (e.g. Florisil) and silicic acid (silica gel) and the like, impregnated with between about 10 to about 40% by weight of silver nitrate (about 25% being preferred) can be used advantageously in the chromatographic column of the process.

Eluants that can be conveniently employed in the process of this invention include increasing percentages of ethyl acetate, chloroform, ether or benzene in cyclohexane, methyl cyclohexane or Skellysolve A (pentanes), Skellysolve B (hexanes) or Skellysolve C (heptanes).

The process of this invention provides a method suitable for pilot scale, semi-commercial or commercial production for the separation of an unsaturated fatty acid ester with $n$ double bonds from other fatty acid esters with $m$ double bonds where $n$ is a whole number greater than zero and $m$ is a whole number, including zero, but less than $n$. The method is especially useful when common methods of separation such as distillation, crystallization, extraction and the like are not suitable, for example where the fatty acid ester with $n$ double bonds is a component of a mixture of fatty acid esters of substantially equal molecular weight, for example differing in the number of double bonds. Typical examples are the mixture of fatty esters, obtained from natural oils after saponification and re-esterification or the residual fatty acid esters remaining after separation of commercially important fatty acids.

A typical fatty acid so obtained is γ-linolenic acid and a preferred source is from borage seed. The borage seed source of γ-linolenic acid is superior to older sources, namely, oil from the seeds of the Oenothera family. Especially valuable are *Borago officinalis* L. and *Symphytum officinale* L. of the Anchuseae family since these have high total oil contents (38% at 21% of dry seed weight) and high percentages of γ-linolenic acid (20% and 27% respectively) as glycerides. Especially important and relevant to the present process is the very low percentages of other triply unsaturated-C-18 acids. There is for example only 0.9% of linolenic acid (9,12,15-octadecatrienoic acid) in *Borago officinalis* L. and 1% in the *Symphytum officinale*. Also other borage seeds have high contents of γ-linolenic acid, namely, *Echium plantagineum*, *Onosmodium occidentale* and *Lappula echnata*. These also contain, however, linolenic acid and 6,9,12,15-octadecatetraenoic acid.

γ-Linolenic acid and its methyl ester are useful as drying oil ingredients. The ester can be converted, by bishomologation following standard procedures, to homo-γ-linolenic acid (cis 8-cis 11-cis 14-eicosatrienoic acid), useful as a precursor of prostaglandins, which have hypotensive and smooth muscle relaxing activities.

The process of this invention can be employed for separating the components of mixtures containing the desired unsaturated fatty acid (as its lower alkyl ester) when the residual or undesired acid ester has either the same or a different number of double bonds as the one desired. However, when the undesired fatty acid has the same number of double bonds as the desired one, the former should not be present in the mixture in excess of about 5% of the total weight of the mixture.

EXAMPLE 1

*γ-Linolenic acid, methyl ester or methyl γ-linoleneate*

(A) A batch of borage seeds (*Borago officinalis* L.) weighing 3.74 kg. was ground in a mill to give a sticky, black semisolid material, which was suspended in 4 l. of Skellysolve B (hexanes) and heated to boiling for about 30 minutes with stirring. The suspension was filtered and the collected solids washed with 1 l. of hot Skellysolve B and the washings added to the filtrate. The filtrate was evaporated in vacuo to give 1310 g. of oil, which was stored under nitrogen at about 0° C. Eighty grams of hydrogen chloride was dissolved in 1600 ml. of methanol while cooling and excluding moisture from the solution, then 160 g. of the above obtained oil added thereto. This mixture was heated to reflux for about 6 hours while stirring under nitrogen, then allowed to stand at room temperature for about 16 hours. Most of the methanol was removed in vacuo, the residue poured into 1 l. of ice water and extracted 3 times with about 700 ml. of ether. The combined extracts were washed with about 500 ml. of saturated sodium bicarbonate solution, then with about 250 ml. of 5% aqueous potassium hydroxide and finaly with water until the washings were neutral. The washings were back extracted with ether and the extracts added to those obtained above. The organic etheral material was dried with sodium sulfate and the ether evaporated in vacuo to give 159 g. of crude methyl esters. Thin-layer chromatography [1] (TLC) of this material dissolved in 10% ethyl acetate: 90% cyclohexane and applied to silica gel (silicic acid) impregnated with silver nitrate, when developed with vanillin:phosphoric acid spray [2] shows three main clearly-separated spots. The desired γ-linolenic acid, methyl ester (methyl γ-linoleneate) is the most polar material.

(B) A batch of 477.5 g. of crude methyl esters (obtained as in A, above) was dissolved in 450 ml. of 10% ethyl acetate:90% cyclohexane and applied to a column

---

[1] Plates employed in TLC were prepared by spraying standard silica gel plates (either regular or microscope slide size) with saturated aqueous silver nitrate solution, then drying them in the dark in vacuo at 40° C. for about 16 hours.

[2] Vanillin:phosphoric acid spray was prepared by dissolving 5 g. vanillin in 173 ml. of 85% phosphoric acid. After standing for about 30 minutes, 250 ml. of water was added and then kept at room temperature for about 16 hours. The precipitated material was removed by filtration and the spray solution stored in the dark.

(protected from light)[3] of 2250 g. of silica gel impregnated with about 560 g. of silver nitrate made up in 10% ethyl acetate: 90% cyclohexane. The column was eluted with 14 l. of 10% ethylacetate: 90% cyclohexane, collecting eighteen 1500 ml. fractions. Further elution was with 10 l. of ethyl acetate followed by 10% methanol:90% ethyl acetate.

Fractions 1 through 12 (weight 296.4 g.): These contained the esters of C–18 monounsaturated acid (C–18:1) and C–18 diunsaturated acid (C–18:2); these esters correspond to the two less polar spots on TLC (demonstrated in the manner described at the end of A, above.) Fractions 13 through 15 (weight 63.6 g.): These were mainly esters of C–18 diunsaturated acid (C–18:2).

Fractions 16 and 17 (weight 18.3 g.). These contained a mixture of the esters of C–18 diunsaturated acid (C–18:2) and the desired C–18 triunsaturated acid (C–18:3).

Remaining fractions (weight 102.7 g.): These showed only one TLC spot corresponding to the most polar ester of the desired C–18 triunsaturated acid (C–18:3), i.e., γ-linolenic acid methyl ester. Since the methanol:ethyl acetate eluates tend to remove some inorganic material from the column, after evaporation of the solvents the oil should be dissolved in Skellysolve B and the insoluble material removed by filtration. As these polyunsaturated fatty acids and their derivatives are readily autooxidized they should be stored under nitrogen at 0° C. When evaporating the later column fractions containing the ester of the desired C–18:3 acid it is preferable to effect this in vacuo or in a nitrogen stream.

Structural proof of the authenticity of the γ-linolenic acid methyl ester obtained herein is furnished by comparisons of its infrared and nuclear magnetic resonance spectra with standard samples of the compound.

Following the procedure of Example 1 but substituting for the methanol employed in part A thereof, the following:

(1) ethanol,
(2) propanol,
(3) isopropanol and
(4) butanol, yields, respectively, (1) γ-linolenic acid, ethyl ester,
(2) γ-linolenic acid, propyl ester,
(3) γ-linolenic acid, isopropyl ester and
(4) γ-linolenic acid, butyl ester.

Following the procedure of Example 1 and the paragraph thereafter, but substituting for the silica gel employed in part B thereof, the following:

(1) diatomaceous earth (Celite) and
(2) synthetic magnesium silicate (Florisil), also yields γ-linolenic acid methyl ester and the corresponding ethyl, propyl, isopropyl and butyl esters.

Following the procedure of Example 1 and the paragraphs thereafter, but substituting *Symphytum officinale* L. for the *Borago officinalis* L. employed therein, also yields γ-linolenic acid methyl ester and the corresponding ethyl, propyl, isopropyl and butyl esters.

Following the procedure of Example 1 but employing Lappula echnata instead of *Borago officinalis* also yields γ-linolenic acid methyl ester but mixed with linolenic acid methyl ester. The fractions eluted later from the chromatogram using 10% methanol:90% ethyl acetate with increasing percentages of methanol give cis 6,9,12,15-octadecatetraenoic acid which is useful as a drying oil ingredient and also as a biosynthetic precursor of the prostaglandins.

Following the procedure of Example 1 and the paragraphs thereafter, but substituting between about 100 g. to about 800 g. of silver nitrate for the 560 g. of silver nitrate employed therein, also yields γ-linolenic acid methyl ester and the corresponding ethyl, propyl, isopropyl and butyl esters.

EXAMPLE 2

γ-Linolenic acid, methyl ester (A) A 30 kg. lot of borage seeds (*Borago officinalis* L.) was mixed with an equal volume of Celite 545 (diatomaceous earth) and pulverized in a mill. The pulverized seeds were stirred with 37 liters of Skellysolve C (heptanes) at about 65° C. for about 10 minutes and filtered. The separated solid material was reextracted with an additional 37 liter portion of Skellysolve C, filtered and the filter cake rinsed with 10 l. of Skellysolve C. The combined filtrates were concentrated to constant weight in a water bath at 50° C. under vacuum. The residual oil weighed 14 kg. The oil was dissolved in 90 l. of methanol and the resulting solution cooled to between about 5° C. to about 0° C.; through a tube extending below the surface of the liquid, a stream of anhydrous hydrogen chloride was passed until about 5.4 kg. had been admitted. The reaction mixture was allowed to stand for about 16 hours at room temperature under a nitrogen atmosphere. Most of the methanol was removed under reduced pressure while warming at about 50° C. The concentrated material was poured into 57 liters of water that had previously been cooled to about 5° C. and then extracted with two 40 liter portions and one 20 liter portion of ether. The combined ether extracts were washed with 32 l. of saturated aqueous sodium bicarbonate solution. These washings were backwashed with 8 l. of ether and the ether layer set aside for later use as a backwash. The main ether solution was washed with a solution of 700 g. of potassium hydroxide in 14 l. of water. The ether solution was washed free of base with water. The aqueous washings were back extracted in turn with the 8 l. of ether previously used and retained. The ether was removed from the pooled ether extracts by distillation, most of it at atmospheric pressure with the final stages of concentration carried out under reduced pressure with a 50° C. water bath as a heat source. The residual oil weighed 9 kg.

(B) A chromatographic column was prepared as follows: 26 kg. of silver nitrate was dissolved in 52 l. of water contained in a 50 gal. jacketed tank; 32 kg. of silica gel was added to the tank and the resulting slurry heated at about 90° C. for about 1 hour; the slurry was filtered and the filter cake dried at between about 105° C. to about 115° C. in a vacuum oven and after drying weighed 42 kg. A mixture of 379 l. of cyclohexane and 41 l. of ethyl acetate (approximately 90%:10%) was prepared. A six inch diameter column was loaded with the 42 kg. of silver nitrate impregnated silica gel and wetted with the mixture of cyclohexane:ethyl acetate. The 9 kg. of residual oil containing the crude esters (obtained in A, above) was dissolved in 9 l. of the 90:10 cyclohexane:ethyl acetate mixture and applied to the chromatographic column. The column was eluted with the balance of the cyclohexane:ethyl acetate mixture and 5 gal. fractions collected. Elution of the column was continued with 112 l. ethyl acetate followed by a mixture of 162 l. of ethyl acetate and 18 l. of methanol. The fractions were analyzed by TLC using silver nitrate impregnated silica gel plates and a 90:10 cyclohexane: ethyl acetate solvent mixture in the manner described in Example 1. Following the procedure of Example 1, those fractions containing the product (γ-linolenic acid, methyl ester), which is the most polar of the three major constituents, had the solvent removed under reduced pressure on a water bath at between about 40° C. and about

---

[3] A satisfactory chromatographic column was prepared as follows: 1 part by weight of silver nitrate was dissolved in 2 parts by weight of water; to this solution 1 part by weight of silica gel [silica gel (0.04–0.2 mm.) for chromatography supplied by E. Merck, Darmstadt] was added with stirring; this mixture was stirred while heating at 90° C. for 1 hour, then cooled and filtered through a Büchner funnel without washing; the silver nitrate:silica gel was dried at 120° C. for about 24 hours in the dark and stored in the dark.

50° C. Fractions 10 through 32 contained 2300 g. of the ester of the desired C-18 triunsaturated acid (C-18:3), namely, γ-linolenic acid methyl ester.

EXAMPLE 3

*γ-Linolenic acid, lower alkyl ester*

A mixture of a crude lower alkyl ester of palmitic, oleic, linoleic and γ-linolenic acids is treated in accordance with the method of part B of Example 1 to yield a pure γ-linolenic acid corresponding lower alkyl ester.

EXAMPLE 4

*γ-Linolenic acid, lower alkyl ester*

A mixture comprising about 5% of a crude lower alkyl ester of pseudoeleostearic acid (10,12,14-octadecatrienoic acid), elaeostearic acid (9,11,13-octadecatrienoic acid), licanic acid (4 - keto-9,11,13-octadecatrienoic acid) and about 95% of γ-linolenic acid (cis 6, cis 9, cis 12-octadecatrienoic acid) is treated in accordance with the method of part B of Example 1 to yield a pure γ-linolenic acid corresponding lower alkyl ester.

EXAMPLE 5

*γ-Linolenic acid, methyl ester*

A mixture comprising about 5% of crude elaeostearic acid metthyl ester and about 95% of crude γ-linolenic acid methyl ester is treated in accordance with the method of part B of Example 1 to yield pure γ-linolenic acid methyl ester.

I claim:

1. A process for the separation of γ-linolenic acid lower alkyl ester from its mixture with associated unsaturated fatty acid lower alkyl esters of substantially the same molecular weight but different number of double bonds, which comprises:
    (1) placing about 1 part by weight of said mixture in contact with between about 3 to about 10 parts by weight of an adsorbent impregnated with between about 5% to about 40% by weight of silver nitrate based on the weight of adsorbent and
    (2) eluting the γ-linolenic acid lower alkyl ester from said adsorbent.

2. The process of claim 1 wherein the mixture of esters is obtained from the trans-esterification of the glyceride oil of borage seed.

3. The process of claim 1 wherein the mixture of esters is obtained from the trans-esterification of the glycereide oil of borage seed, said seed being selected from the group consisting of *Borago officinalis* L. and *Symphytum officinale* L.

4. The process of claim 1 wherein the associated unsaturated fatty acid lower alkyl esters of substantially the same molecular weight but different number of double bonds are selected from the group consisting of those of palmitic, oleic and linoleic acids.

5. The process of claim 1 wherein the lower alkyl esters of γ-linolenic acid and the associated unsaturated fatty acid lower alkyl esters of substantially the same molecular weight but different number of double bonds are both methyl.

6. The process of claim 1 wherein the adsorbent is selected from the group consisting of diatomaceous earth, synthetic magnesium silicate and silicic acid.

7. The process of claim 1 wherein the adsorbent is impregnated with 25% by weight of silver nitrate based on the weight of adsorbent.

8. The process of claim 1 wherein the γ-linolenic acid lower alkyl ester is eluted from the adsorbent with a mixture of cyclohexane and ethyl acetate.

9. The process of claim 1 wherein the mixture of esters is obtained from the trans-esterification of the glyceride oil of *Borago officinalis* L., the lower alkyl ester of γ-linolenic acid is methyl, methyl linoleate is the associated unsaturated fatty acid lower alkyl ester of substantially the same molecular weight but different number of double bonds from that of γ-linolenic acid methyl ester, the adsorbent is silicic acid, the silicic acid is impregnated with 25% by weight of silver nitrate based on the weight of silicic acid and the γ-linolenic acid methyl ester is eluted from the silicic acid with a 90:10 mixture of cyclohexane:ethyl acetate.

10. A process for the separation of γ-linolenic acid lower alkyl ester from its mixture with a maximum of about 5% of associated unsaturated fatty acid lower alkyl esters of substantially the same molecular weight and same number of double bonds based on γ-linolenic acid lower alkyl esters which comprises:
    (1) placing about 1 part by weight of said mixture in contact with between about 3 to about 10 parts by weight of an adsorbent impregnated with between about 5% to about 40% by weight of silver nitrate based on the weight of adsorbent and
    (2) eluting the γ-linolenic acid lower alkyl ester from said adsorbent.

References Cited

Subbaram et al., Journal of Science, Food and Agriculture, vol. 15, pp. 645–652 (1964) (England).

LORRAINE A. WEINBERGER, *Primary Examiner.*

J. H. NIELSON, *Assistant Examiner.*